United States Patent [19]

Okii et al.

[11] Patent Number: 4,945,059

[45] Date of Patent: Jul. 31, 1990

[54] METHOD OF PROLIFERATING VESICULAR-ARBUSCULAR MYCORRHIZAL FUNGI

[75] Inventors: Mitsuyoshi Okii, Ami; Shunichi Ishijima, Miho, both of Japan

[73] Assignee: Kyowa Hakko Kogyo Co., Ltd., Tokyo, Japan

[21] Appl. No.: 104,396

[22] Filed: Oct. 1, 1987

[30] Foreign Application Priority Data

Oct. 2, 1986 [JP] Japan .................................. 61-235406

[51] Int. Cl.$^5$ .......................... C12P 1/02; C12N 1/14; C12R 1/645
[52] U.S. Cl. .................................. 435/254; 435/171; 435/911; 47/58; 71/5; 71/77
[58] Field of Search ....................... 435/171, 254, 911; 47/58; 71/5, 77

[56] References Cited

PUBLICATIONS

Transactions of the British Mycological Society, 42, 273 (1959).
Soil Biology and Biochemistry, 11, 269 (1979).
Soil Biology and Biochemistry, 15, 55, (1983).
Canadian Journal of Microbiology, 26, 1340 (1980).
Transactions of the British Mycological Society 79, 305 (1982).
Transactions of the British Mycological Society 81, 153, (1983).
Mycologia, 47, 619, (1955).
Mycologia, 71, 178-198 (1979).
Mycotaxon, 4, 155-160 (1976).

Primary Examiner—Thomas G. Wiseman
Assistant Examiner—Richard C. Peet
Attorney, Agent, or Firm—Michael N. Meller

[57] ABSTRACT

A method of proliferating vesicular arbuscular mycorrhizal fungi (i.e., VAM fungi) is disclosed which comprises inoculating VAM fungi in a soil medium containing a potato and a porous amphoteric ion exchanger, an accelerator and, optionally, in the presence of a VAM formation accelerator.

An advantage gained by the use of VAM fungi in cultivation of plants can be found in the fact that smaller amounts of fertilizers need be used when combined with VAM fungi, as opposed to the use of fertilizers alone.

4 Claims, No Drawings

METHOD OF PROLIFERATING VESICULAR-ARBUSCULAR MYCORRHIZAL FUNGI

SUMMARY OF THE INVENTION

The present invention relates to a method of proliferating vesicular-arbuscular mycorrhizal fungi which comprises inoculating vesicular-arbuscular mycorrhizal (hereinafter referred to as VAM) fungi in a soil medium containing a porous amphoteric ion exchanger, with a VAM fungi growth accelerator and/or a VAM formation accelerator adsorbed thereonto, and growing a potato in the soil medium.

DETAILED DESCRIPTION OF THE INVENTION

1. Field of Industrial Application

The present invention relates to a method of proliferating VAM fungi. An advantage gained by the use of VAM fungi in cultivation of plants can be found in the fact that smaller amounts of fertilizers need be used when combined with VAM fungi, as opposed to the use of fertilizers alone.

2. Prior Art

The symbiotic relationship between plants and microorganisms has been known for a long time. For example, (a) leguminous plants incorporate rhizobium bacteria into the roots to have the bacteria make root nodules and utilize their function. (b) Plants belonging to the genus Alnus or yams incorporate Actinomycetes therein to produce Actinomycetic mycorrhizae which are symbiotic with its hosts. (c) Most plants have taken to fungi such as molds and mushrooms (Basidiomycetes) on the plant roots and utilize their function.

Among true fungi in (c), above, it is said that the 4 fungi (genus: Gigaspora, Glomus, Sclerocystis and Accaulospora) belonging to the order Endogonales form VAM in almost all plants. Endogonales belongs to the sub-class Zygomyces under the category Phycomycetes.

Attention of researchers in the fields of agriculture, forestry and horticulure has been paid to the VAM fungi in recent years because it has been gradually recognized that the VAM fungi (symbiotic fungi) impart a relatively large resistance to several growing plants (e.g., edible crops, horticultural products, technical crops, foodstuffs, and forestry products) under disadvantageous conditions (dry state, great change in humidity, a variety of blight bacteria, a state deficient in minerals such as phosphorus, Zn, Mg, Ca, etc. and disturbances caused by salts, and the like) to symbiotic plants, upon cultivation of edible crops, horticultural products, technical crops, foodstuffs and forestry products.

In order to artificially inoculate VAM fungi to induce VAM, it is necessary to proliferate VAM fungi in large quantities. However, VAM fungi are classified into endotrophic mycorrhizal and are absolute symbiotic fungi. It has been considered that it is impossible to conduct a pure culture of VAM fungi, unlike mycorrhizal fungi of plants belonging to the genus Orchidaceae (Ascomycetes, Basidiomycetes and Deuteromycetes) and mycorrhizal fungi of plants belonging to the genus Ericaceae (Ascomycetes and Deuteromycetes). Mycorrhizal fungi of plants belonging to these two families are either parasite or saprophyte.

In order to prepare an ecosystem capable of facilitating formation of VAM, a method is known in which charcoal, such as charcoal powders, obtained by carbonizing barks of broad-leaf trees is given to the soil (Makoto Ogawa, Kagakutoseibutsu (Chemistry and Organism), 23, (2), 103–111 (1985)).

Media for VAM fungi containing naturally occurring or synthetic inorganic or organic porous adsorbents are known (Japanese Published Unexamined patent application No. 237987/85).

As hypha growth accelerators for VAM fungi, there are known organic acids such -as oxaloacetic acid, acetic acid, pyruvic acid, citric acid, tartaric acid, etc. (Transactions of the British Mycological Society, 42, 273 (1959)); thiamine (Soil Biology and Biochemistry, 11, 269 (1979)); and amino acids such as cystine, glycine, lysine, etc. (ibid., 15, 55 (1983)).

Based on the finding that most ectotrophic mycorrhizal fungi produced ethylene in pure cultures, it is known that ethylene might be involved in infections of ectotrophic mycorrhizal fungi (Canadian Journal of Microbiology, 26, 1340 (1980)). Germ tubes of most spores of Gigaspora gigantea grew to contact roots of host plants, apparently in response to a volatile attractant released from the roots. (Transactions of the British Mycological Society, 79, 305 (1982)). The great suppression of VAM infection in the presence of potassium permanganate indicates that easily oxidizable compounds such as ethylene have a largely stimulating effect on VAM infection (Transactions of the British Mycological Society, 81, 153 (1983)).

Problems to be Solved by the Invention

For purposes of overcoming the difficulty in proliferation of VAM fungi which are absolute symbiotic fungi in large quantities, the present inventors have investigated the method of proliferation of VAM fungi in large quantities over many years. Tomatoes, cucumbers, sweet corn, etc. were water cultured and spores of VAM fungi were inoculated on roots taken, that is, *Gigaspora gregaria* or *Gigaspora margarita* was inoculated on the roots of the tomatoes, cucumbers or sweet corn during the course of aquaculture but VAM fungi hardly grew and favorable results could not be obtained. In Japanese Published Unexamined patent application No. 237987/85, there is described a method which comprises using play clay or pumice as a VAM fungi adsorbent, growing roots of sweet corn on the adsorbent and inoculating spores of *Glomus fosciculatum* thereon to give spores and hyphae of the fungi. Following this method, the present inventors conducted experiments such as varying the adsorbent, using various species of plants, changing the composition of the medium for a hydroponic solution, determining the amount of a hydroponic solution to be added and the amount of VAM fungi (*Gigaspora gregaria* or *Gigaspora margarita*) to be inoculated. In these experiments, proliferation of VAM fungi to a certain extent was observed only when the amount of a hydroponic solution added and a moisture content of the adsorbent were limited.

There has always been a need and demand for an excellent method of proliferating VAM fungi.

No method of proliferation of VAM fungi using potatoes and porous amphoteric ion exchangers in combination had been developed until the present invention.

Means for Solving the Problems

According to the method of the present invention, VAM fungi can be proliferated by inoculating VAM fungi in a soil medium containing a porous amphoteric ion exchanger with a VAM fungi growth accelerator and/or a VAM formation accelerator adsorbed thereto and growing a potato in the soil.

As the VAM fungi, any fungi can be used as long as they are capable of producing VAM and there are mentioned, for example, fungi belonging to the genus Gigaspora, Glomus, Sclerocystis, Entrophospora or Acaulospora. Specific examples include *Gigaspora gregaria* and *Gigaspora margarita*.

For isolation of VAM fungi from the soil, there is known the wet sieving method (Mycologia, 47, 619 (1955)). By this method, the procedure of isolating, for example, *Gigaspora gregaria* and *Gigaspora margarita* from the soil, is shown below.

An outermost soil layer having a depth of 3 to 10 cm is stripped from a field. The soil is rendered into mud and gently washed with tap water over sieves of 2 mm, 0.1 mm and 0.05 mm overlaid with each other. Dusts and the like remaining on the 2 mm-sieve are discarded. While sieving the matter remaining on 0.1 mm-sieves and on 0.05 mm-sieves are gently washed with running water to remove the mud and float dusts. The dusts remaining on 0.05 mm-sieves and on 0.1 mm-sieves are collected and placed in a Petri dish, and observed by stereoscopic microscopy.

Considerably large spores shaped like glass beads are observed together with root fragments, solid grains (soil), nematodes and plant tissues. The spores are picked up one by one and placed in a small Petri dish with a pipette, preferably a Komagome pipette having a tapered tip. The spores are washed with tap water several times since hyphae are sprinkled therearound or dust is stuck thereto. The thus obtained spores shaped like glass beads (spherical diameter, 0.2 to 0.6 mm) are spores of the VAM fungi. The spores have been classified into *Gigaspora gregaria* based on Mycologia 71, 178–198 (1979) and into *Gigaspora margarita* based on Mycotaxon, 4, 155–160 (1976).

As the potatoes of host plants, a white potato, a sweet potato, a Jerusalem artichoke, a taro, etc. may be used.

As the VAM fungi growth accelerators, there can be used organic acids (oxaloacetic acid, pyruvic acid, acetic acid, citric acid, tartaric acid, etc.); amino acids (cystine, methionine, glycine, lysine, etc.); vitamins (thiamine, etc.); and the like.

As the VAM formation accelerators, there can be used ethylene generators (Ethephon ® (2-chloroethyl phosphoric acid), Etacelasil ® (2-chloroethyl-tris-(2-methoxy-ethoxy) silane), etc. auxins (naphthaleneacetic acid, indoleacetic acid, etc.) and the like.

As the porous amphoteric ion exchangers, there are porous ion exchangers having both an acidic group and a basic group as exchange groups. Specifically, there can be used Adelite ® (product of Nishiyodo Air Conditioner Co., Ltd.), DEAE-CPG ® (product of Electro-Nucleonics Co., Ltd., DEAE-Cellulofine ® (product of Seikagaku Kogyo Co., Ltd.), etc.

An amount of the amino acid to be adsorbed onto the porous amphoteric ion exchanger is in a range of from 10 to 1000 mg/1, preferably from 50 to 400 mg/1, an amount of the organic acid in a range of from 1 to 1000 mg/1, preferably from 5 to 200 mg/1, an amount of the vitamin in a range of from 1 to 50 mg/1, preferably from 5 to 10 mg/1, and an amount of the VAM formation accelerator in a range of from 0.05 to 20 mg/1, preferably from 1 to 5 mg/1. As the soil medium, sand, soil, humus, and the like can be used.

An amount of the ion exchanger is in a range of from 5 to 30% (v/v), preferably from 15 to 25% (v/v), based on the soil medium. Cultivation of the potatoes is performed for 2 to 4 months under 1 to 200,000 lux for 12 to 18 hours daytime, at 25° to 33° C. with sweet potatoes and taros and at 19° to 25° C. with Jerusalem artichokes and white potatoes. Thereafter, the feeding of water is discontinued in order to wither the plants. Thus the soil medium containing the VAM fungi is obtained.

A more efficient method of proliferating the VAM fungi involves inoculation of the VAM fungi directly on or around the roots of the potatoes planted in the soil medium.

The VAM fungi grow in the soil medium so that it is not efficient to isolate the VAM fungi alone from the soil medium and use them independently. In general, it is effective to use the VAM fungi-containing soil medium (hereinafter sometimes referred to as VAM fungi inoculate) as it is in combination with fertilizers. In the case where the VAM fungi inoculate having a higher density is utilized, the porous amphoteric ion exchanger may be separated from the soil medium and used in combination with fertilizers.

The present invention will be described by referring to an example and reference examples below.

EXAMPLE 1

Spores of the VAM fungi were collected from the soil of a soybean field according to the wet sieving method. The obtained spores were *Gigaspora gregaria* and *Gigaspora margarita*. These spores were washed using ultrasonic waves and further with sterilized water, 10 times each.

Separately, 100 mg of glycine, 200 mg of lysine, 100 mg of cystine, 100 mg of methionine, 50 mg of acetic acid, 50 mg of citric acid, 50 mg of pyruvic acid, 50 mg of oxaloacetic acid, 5 mg of thiamine and 3 mg of Ethephon were dissolved in 300 ml of water. Then, the solution was sterilized by filtration, and aseptically sprayed onto Adelite having a 1 liter volume which had been sterilized, to uniformly adsorb the solution thereto.

A suitable amount of sterilized pebbles was charged on the bottom of a sterilized Wagner pot of 1/5000 a and a soil medium obtained by mixing sterilized sand (grain diameter of 1 to 2 mm) and the previously prepared Adelite in various volume ratios shown in Table 1 was filled on the pebbles. At the center of the filled soil medium, 1 potato (species, May Queen) was planted. Then, 30 spores of *Gigaspora gregaria* were inoculated on the potato and germinated to take root in a thermostat (12,000 lux, for 14 daytime hours) with a lighting system which was kept at 21°±2° C. Cultivation was carried out for 3 months while supplementing aseptic water to a suitable degree as needed. After a period of three months, supplementation of aseptic water was discontinued and cultivation was carried out for further a month under the conditions described above. After the water supply was discontinued, the part of the potato grown on the ground was allowed to wither and the soil medium (VAM fungi inoculate) became a dry state.

The spores and *Gigaspora gregaria* were separated from the soil medium in accordance with the wet sieving method. The results are shown in Table 1 below.

However, it should be taken into account that the number of the spores incorporated into the porous part of the porous amphoteric ion exchanger used in the example was not reflected in the results shown in Table 1. Namely, according to the inventors' experience, 20 to 60% of the spores are incorporated into the porous portion of Adelite or strongly adsorbed to Adelite through the roots of the potato, in many cases.

TABLE 1

| Sand (ml) | Adelite (ml) | Number of Spores of Gigaspora gregaria per Pot (2500 ml) |
|---|---|---|
| 2500 | 0 | 475 |
| 2375 | 125 | 825 |
| 2250 | 250 | 1300 |
| 2125 | 375 | 1875 |
| 2000 | 500 | 1500 |
| 1875 | 625 | 1250 |
| 1750 | 750 | 750 |

From the results of Table 1, it is seen that a large number of spores are formed in a mixing ratio of Adelite of 10 to 25% (v/v). Further taking the number of the sphores incorporated into the porous portion into account, the number of 20 to 60% should be added to that of the spores shown in Table 1.

REFERENCE EXAMPLE 1

(Test on growth of tomato assumption of spore adsorption rate of Adelite)

The soil medium having an Adelite mixing volume ratio of 20% (2000 ml of sand+500 ml of Adelite) shown in Table 1 in Example 1 was thoroughly mixed and used as an inoculate in this run.

Sterilized soil was packed in an unglazed pot having a diameter of 15 cm. A shallow hole was made at the center of the pot. The inoculate described above was charged in the hole in amounts of 5, 10, 20 and 25 ml, as shown in Table 2. After the soil was made flat, seeds of tomato were sown and covered up lightly with soil. Cultivation was carried out in a greenhouse (20° to 30° C.). After sowing the height of the tomato plant was measured in the fourth week. The results are shown in Table 2. Separately, and parallel to these runs, there were also performed runs in which 5, 10, 20 and 30 spores of Gigaspora gregaria were inoculated instead of the inoculate. The runs were carried out with 3 series in one group using one plant/pot.

TABLE 2

| Amount of Inoculate (ml) | Height of Tomato (cm) | No. of Spores of Gigaspora gregaria Inoculated | Height of Tomato Plant (cm) |
|---|---|---|---|
| 5 | 7.6–8.0 | 5 | 7.5–7.8 |
| 10 | 8.6–9.0 | 10 | 8.4–8.9 |
| 20 | 9.0–9.3 | 20 | 8.9–9.3 |
| 25 | 9.2–9.6 | 30 | 9.2–9.4 |

From Table 2, it is assumed that the number of spores present in 5, 10, 20 and 25 ml of the inoculate would be approximately 5, 10, 20 and 30, respectively. Accordingly, it is assumed that approximately 2500 spores are present in the soil medium containing 20% (v/v) Adelite in Table 1 and that approximately 1000 spores are adsorbed to the porous portion of Adelite (adsorption rate of about 40%).

From Table 2, it is considered reasonable that the soil medium itself be used as the inoculate without separating the spores therefrom. Further, in the case where sand should be separated, the separation can be effected in such a simple manner as by gently shaking the soil medium.

REFERENCE EXAMPLE 2

(Infectious test to VAM fungi inoculate)

Soil was packed in each of 3 Wagner pots of 1/5000 a and the same inoculate as used in Reference Example 1 was inoculated using 10 ml each at the center of each pot, and seeds of onion, soybean and cucumber were sown and covered up with soil. They were cultivated under outdoor conditions and the rate of VAM formation was examined 2 months after the inoculation. The VAM formation rate was determined using about 2 cm of the tip of these roots, in accordance with a modified method (Yanbe, Previw of the 89th Forestry Association, page 121 (1978)) from the method of Phillips, et al. The results are shown in Table 3.

TABLE 3

| Plant | VAM Formation Rate (%) |
|---|---|
| Onion | 35 |
| Soybean | 70 |
| Cucumber | 71 |

As shown in Table 3, a high formation rate was noted even in the outdoors.

REFERENCE EXAMPLE 3

(Test on increasing yield of soybean by inoculation of VAM fungi inoculate)

A VAM inoculate was obtained in a manner similar to Example 1 except that Gigaspora margarita was used in place of Gigaspora gregaria. In obtaining the inoculate, a mixing volume ratio of sand used to Adelite with VAM fungi having 10 accelerators adsorbed thereto was 500 ml of the VAM fungi accelerator to 2000 ml of sand (Adelite ratio of 20% (v/v)). The field soil was plowed, and fertilized (manured). One week later, 10 ml/seed of the VAM fungi inoculate was put under soybean seeds and covered up with soil. The runs were carried out under outdoor conditions.

On the other hand, as control, runs were performed by providing (a) a group free from any fertilizer in which no VAM fungi inoculate, (b) a group in which 200 g/m$^2$ of chemical fertilizer (N-P-K, 8:8:8) alone was given, (c) a group in which the same chemical fertilizer as used in (b) was given in amounts of 5, 10, 15 and 20 g/m$^2$ and the VAM fungi inoculate was inoculated on each of them and (d) a group free from any fertilizer in which the VAM fungi inoculate was inoculated. The runs were repeated 10 times with 10 plants in each group. The weight (fresh weight, g) of soybean sheath was regarded to be the yield, which is shown in Table 4.

TABLE 4

| Test Group | Sheath Weight per One Soybean Plant (g) |
|---|---|
| (a) No inoculate, no fertilizer | 25 |
| (b) Fertilizer only (200 g/m$^2$) | 80 |
| (c) VAM fungi inoculate and fertilizer | |
| 5 g/m$^2$ | 81 |
| 10 g/m$^2$ | 85 |
| 15 g/m$^2$ | 89 |
| 20 g/m$^2$ | 91 |

TABLE 4-continued

| Test Group | Sheath Weight per One Soybean Plant (g) |
|---|---|
| (d) VAM fungi inoculate only | 65 |

As is evident from Table 4, excellent effects can be obtained using a much smaller amount of the fertilizer than in the group given with the fertilizer alone, by inoculating the VAM fungi inoculate.

What we claim is:

1. A method of proliferating vesicular arbuscular mycorrhizal fungi (VAM fungi) which comprises inoculating VAM fungi selected from fungi belonging to the genus Gigaspora, Glomus, Sclerocystis, Entrophospora or Acaulospora in a soil medium containing a potato and a porous amphoteric ion exchanger selected from the group consisting of Adelite, DEAE-CPG and DEAE-Cellulofine adsorbed by a VAM fungi growth accelerator selected from the group consisting of organic acids, amino acids and vitamins and/or a VAM formation accelerator selected from the group consisting of ethylene generators and auxins, and growing a potato in the soil medium.

2. A method according to claim 1 wherein the organic acid is selected from the group consisting of oxaloacetic acid, pyruvic acid, acetic acid, citric acid and tartaric acid, the amino acid is selected from the group consisting of cystine, methionine, glycine and lysine, and the vitamin is thiamine.

3. A method according to claim 1 wherein the ethylene generators are selected from the group consisting of 2-chloroethyl phosphoric acid and 2-choroethyl-tris(2-methoxy-ethoxy) silane and the auxin is selected from the group consisting of naphthaleneacetic acid and indoleacetic acid.

4. A method according to claim 1 wherein the potato is selected from the group consisting of a white potato, sweet potato, Jerusalem artichoke and taro.

* * * * *